J. R. GAMMETER.
TIRE FLAP.
APPLICATION FILED MAR. 27, 1922.

1,416,187.

Patented May 16, 1922.

Inventor
John R. Gammeter
By Robert M. Pierson
Atty

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

TIRE FLAP.

1,416,187.   Specification of Letters Patent.   Patented May 16, 1922.

Application filed March 27, 1922. Serial No. 547,029.

*To all whom it may concern:*

Be it known that I, JOHN R. GAMMETER, a citizen of the United States, residing at Akron, in the county of Summit and State of Ohio, have invented a certain new and useful Tire Flap, of which the following is a specification.

This invention relates to the flaps employed in pneumatic tires to keep the inner tube from coming in contact with the rim and from being pinched between the rim and the beads of the casing, such flaps being commonly employed with inextensible-bead tires and being commonly made of the so-called "floating" variety, secured in place only by the pressure of the inner tube and by a connection with the valve stem at the overlapping ends of the flap. It is a rather frequent occurrence for these floating flaps to become displaced from their proper position and cause injury to the tube, and it is therefore desirable that the flap should be made substantially flat-bottomed so as to conform more closely to the shape of the recess between the tire beads, over the rim.

My invention is particularly concerned with a flat-bottomed or full-form flap, and it aims to provide a readily moldable flap which may be constructed to give efficient service at a reduced cost of manufacture in comparison with ordinary flaps built up of many plies of rubberized fabric.

Figure 1:
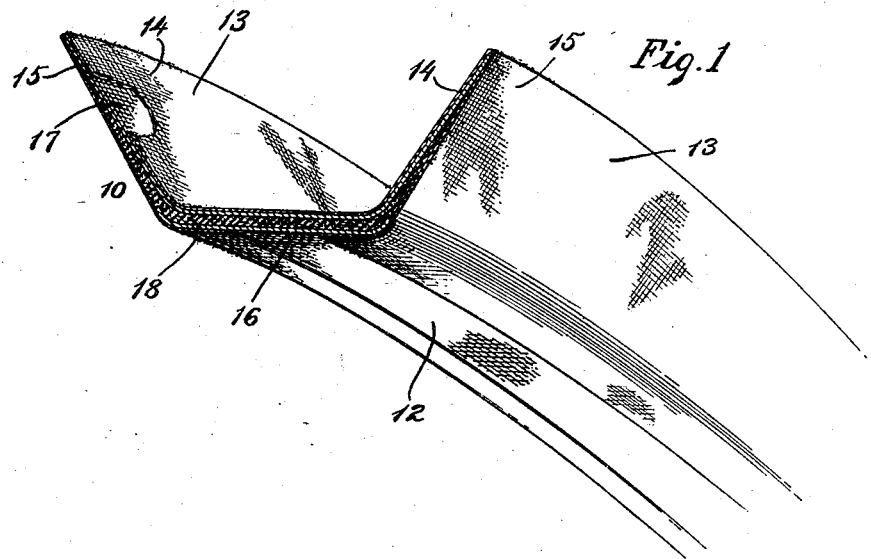

Of the accompanying drawings, Fig. 1 is a sectional, perspective view of a tire-flap constructed according to my invention.

Figure 2:
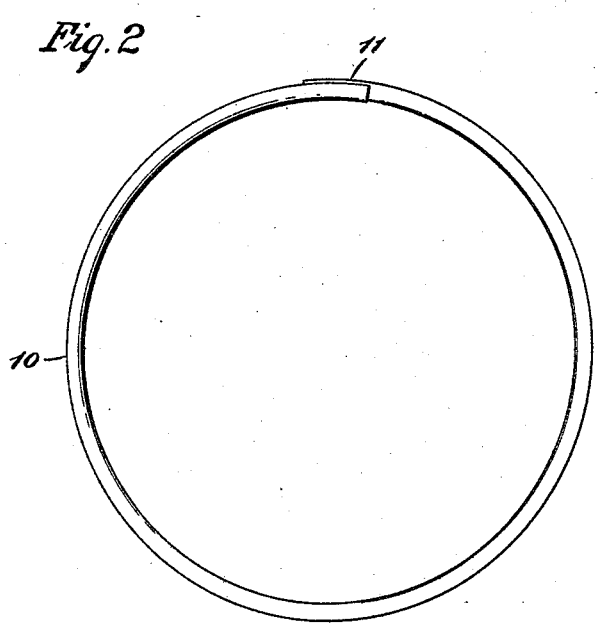

Fig. 2 is a side elevation showing the annular flap with overlapped ends.

In the drawings, 10 is the trough-shaped flap molded in arcuate form and adapted to have its ends overlapped, as indicated at 11, and provided thereat with the usual holes or slots for the passage of the valve stem (not shown).

The flap 10 comprises a substantially-flat middle or bottom portion 12 of considerable thickness, and flaring side portions 13 tapering from a thickness substantially the same as that of the bottom portion where they join said portion, to thin terminal edges. The surface portions of the flap include front or outer, and back or inner plies 14, 15 of woven fabric, either or both of which may be of ordinary cotton duck or, more desirably, of cotton flannel, so as to slip easily on the surfaces with which they come in contact. These plies as shown are parts of a single strip of fabric connected around the outer edges of the flap, and having their edges separated on the inner periphery of the flap to expose a frictional surface to the rim, said surface being preferably the rubber coating on a ply of fabric 16 covering the bottom and corner edges of the trough. Another ply of rubberized fabric 17 adjacent the outer periphery, under the cover ply 14, serves as a reinforcement.

Between the outer and inner fabric plies 14, 17 and 15, 16 is interposed a filler 18 of "rag stock" or rubber and fiber compound containing sufficient rubber to flow readily under the heat and pressure of the flap molding and vulcanizing apparatus. This filler may be laid up with plies of calendered stock of graduated widths, and after being properly assembled with the fabric layers, a length of the laminated flap material is run either continuously or in steps through a suitable heated mold which vulcanizes it in the desired shape both longitudinally and transversely, after which the flaps are cut off to the desired length, punched, and skived at the ends in the usual manner. The filler 18 is readily moldable and will retain its shape when vulcanized so as to avoid displacement of the flap from its proper position between the tube and the rim, while at the same time the use of the rubber and fiber stock in place of the more expensive rubberized fabric considerably reduces the cost of manufacture.

I claim:

1. A pneumatic-tire flap comprising a trough-shaped structure adapted to be interposed between the tube, the casing beads and the rim of a pneumatic tire and composed of surface plies of fabric and an interposed filler of rubber and fiber compound.

2. A pneumatic-tire flap comprising an annular, substantially flat-bottomed, trough-shaped structure having overlapped ends and composed of surface plies of fabric and an interposed filler of vulcanized rubber and fiber compound.

In witness whereof I have hereunto set my hand this 25 day of March, 1922.

JOHN R. GAMMETER.